(12) United States Patent
Ding et al.

(10) Patent No.: US 7,672,668 B2
(45) Date of Patent: Mar. 2, 2010

(54) CALIBRATION SYSTEM ARCHITECTURE FOR CALIBRATING MULTIPLE TYPES OF BASE STATIONS IN A WIRELESS NETWORK

(75) Inventors: Yinong Ding, Plano, TX (US); Paul Nelson, Frisco, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 11/221,088

(22) Filed: Sep. 7, 2005

(65) Prior Publication Data

US 2007/0054698 A1 Mar. 8, 2007

(51) Int. Cl.
H04W 24/00 (2009.01)
H04M 1/00 (2006.01)

(52) U.S. Cl. .................................. 455/423; 455/562.1

(58) Field of Classification Search ................. 455/423, 455/561

See application file for complete search history.

(56) References Cited

U.S. PATENT DOCUMENTS

| | | | | |
|---|---|---|---|---|
| 5,471,649 | A * | 11/1995 | Rees et al. | 455/67.14 |
| 6,236,839 | B1 * | 5/2001 | Gu et al. | 455/67.14 |
| 6,693,588 | B1 * | 2/2004 | Schlee | 342/368 |
| 7,062,294 | B1 * | 6/2006 | Rogard et al. | 455/562.1 |
| 7,102,569 | B2 * | 9/2006 | Tan et al. | 342/368 |

* cited by examiner

*Primary Examiner*—Patrick N Edouard
*Assistant Examiner*—Huy C Ho

(57) ABSTRACT

A method of calibrating a base station that comprises an adaptive antenna array is provided. The method includes selecting one operational mode from a plurality of operational modes for the base station. An operational mode component set corresponding to the selected operational mode is selected from a plurality of operational mode component sets in the base station. The base station is calibrated using the selected operational mode component set.

22 Claims, 6 Drawing Sheets

CALIBRATION SYSTEM ARCHITECTURE FOR CALIBRATING MULTIPLE TYPES OF BASE STATIONS IN A WIRELESS NETWORK

CROSS-REFERENCE TO RELATED APPLICATION AND CLAIM OF PRIORITY

The present disclosure is related to that disclosed in U.S. patent application Ser. No. 11/221,190, filed concurrently herewith, entitled "METHOD AND SYSTEM FOR CALIBRATING MULTIPLE TYPES OF BASE STATIONS IN A WIRELESS NETWORK." U.S. patent application Ser. No. 11/221,190 is assigned to the assignee of the present application. The subject matter disclosed in U.S. patent application Ser. No. 11/221,190 is hereby incorporated by reference into the present disclosure as if fully set forth herein.

TECHNICAL FIELD OF THE INVENTION

The present disclosure relates generally to wireless communications and, more specifically, to a calibration system architecture for calibrating multiple types of base stations in a wireless network.

BACKGROUND OF THE INVENTION

In a base station of a wireless communication network, the antenna is the port through which radio frequency (RF) energy is coupled from the transmitter to the outside world and to the receiver from the outside world. By using an array of antennas, a number of benefits are expected including improved directionality, higher signal-to-noise ratio (SNR), and better capability of interference rejection for received signals.

Manufacturers of antenna array systems formerly used signal processors that assumed ideal antenna array characteristics. Therefore, antenna arrays used in association with former signal processors had to achieve high quality standards to perform acceptably, making antenna arrays expensive. Additionally, these antenna array systems experienced degraded performance when temperatures changed, humidity levels changed, or other environmental conditions changed because the characteristics of the antenna array diverged from the expected ideal characteristics under these altered environmental conditions.

Calibration systems play an important role in modern wireless communication systems employing adaptive antenna technologies, for example antenna arrays. Depending on the applications and the signal processing algorithms employed by the base station, antenna array calibration includes determining the characteristics of the RF paths of the base station and using the characteristic data to optimize base station radio transmission and radio reception. In some cases the term "calibration" may be used to refer to the determination of system characteristics, while in other cases the term "calibration" may be used to refer to the use of the characteristic data to optimize base station radio transmission and radio reception. The meaning of the use of the term calibration will be understood by the context in which it is used. The characteristic data may be referred to as calibration data. Smart antenna systems particularly may benefit from the enhanced system performance that can be obtained from calibration.

Modern antenna array systems typically store calibration data that is then used to optimize radio transmission and reception. Conventional methods and systems for obtaining the calibration data, however, have many drawbacks. The known calibration systems may include extensive measuring equipment that is both unwieldy and expensive. Some conventional calibration methods are sensitive to drifts in system parameters, and these drifts lead to inaccuracies in the calibration data obtained using these methods. To avoid these difficulties, some antenna arrays are assigned calibration data that is generic for their particular design but that does not represent the characteristics unique to the individual antenna array. Because conventional calibration methods may be sufficiently time-consuming that periodic recalibration is impractical, some antenna arrays are calibrated only in the factory or upon initial installation, and thereafter their characteristics may diverge from the factory calibration data as the antenna array ages or as environmental conditions change. Antenna arrays that have not been individually and recently calibrated in their current environment will have inaccuracies in their array calibration data that will result in performance degradation.

Current approaches to overcome these difficulties with antenna array calibration techniques may provide a calibration system built into the base station. Calibration methods and systems may be designed that minimize the duration of time required to measure antenna array calibration data. Current calibration architectures, however, are typically designed for specific vendors and systems, are manufactured in low volume, and are relatively expensive.

Therefore, there is a need in the art for an improved calibration system architecture for wireless networks. In particular, there is a need for a calibration system architecture capable of calibrating any type of base station, such as single-sector, single-frequency allocation (FA) base stations, multi-sector, multi-FA base stations and any combination thereof.

SUMMARY OF THE INVENTION

A method of calibrating a base station in a wireless network is provided. The method comprises selecting one operational mode from a plurality of operational modes for the base station, selecting an operational mode component set corresponding to the selected operational mode from a plurality of operational mode component sets in the base station, and calibrating the base station using the selected operational mode component set.

According to one embodiment of the present disclosure, the base station is calibrated by providing a known signal to the base station, receiving a processed signal from the base station, the processed signal comprising the known signal processed by the base station for transmission, and comparing the processed signal to the known signal.

According to another embodiment of the present disclosure, the processed signal is received from the base station through the selected operational mode component set.

According to still another embodiment of the present disclosure, the base station is calibrated by providing a known signal to a combiner/splitter of the base station, receiving a processed signal from the base station, the processed signal comprising the known signal processed by the base station after receipt at the combiner/splitter, and comparing the processed signal to the known signal.

According to yet another embodiment of the present disclosure, the known signal is provided to the combiner/splitter through the selected operational mode component set.

According to a further embodiment of the present disclosure, the operational modes include at least a frequency division duplexing (FDD) operational mode and a time division duplexing (TDD) operational mode.

According to a still further embodiment of the present disclosure, the operational mode component set corresponding to the FDD operational mode comprises a duplexer, a receive filter and a transmit filter, and the operational mode component set corresponding to the TDD operational mode comprises a bandpass filter, a transmit/receive switch, and a transmit/receive switch control.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Figure 1:
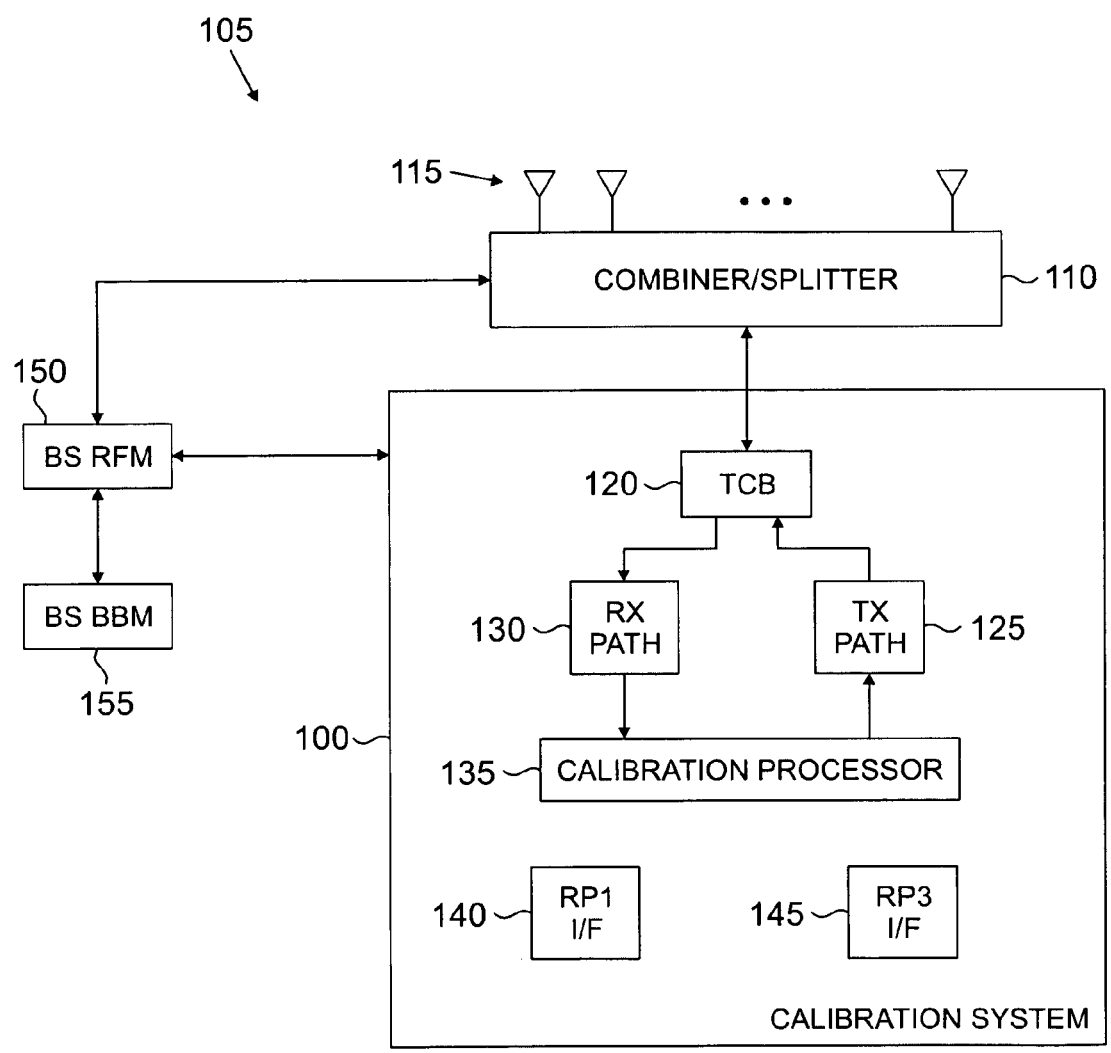
FIG. 1 illustrates a calibration system for a single-sector, single-FA base station according to one embodiment of the present disclosure.

FIG. 1 illustrates a calibration system 100 for a single-sector, single-frequency allocation (FA) base station 105 according to the principles of the present disclosure. In addition to calibration system 100, base station 105 comprises a combiner/splitter 110 and an adaptive antenna array 115. It will be understood that base station 105 comprises additional components not illustrated in FIG. 1.

Calibration system 100 comprises a transceiver control box (TCB) 120, a transmit (Tx) path 125, a receive (Rx) path 130, a calibration processor 135, reference point 1 (RP1) interfaces 140 and RP3 interfaces 145. Calibration system 100 and/or an operator of calibration system 100 may initiate a calibration of base station 105 based on temperature, weather, base station location, elapsed time since a previous calibration and/or any other suitable calibration indicators.

Transceiver control box 120 comprises a plurality of operational mode component sets. For example, transceiver control box 120 may comprise a component set for a frequency division duplexing (FDD) operational mode and a component set for a time division duplexing (TDD) operational mode. However, it will be understood that transceiver control box 120 may comprise any suitable number of any suitable operational mode component sets without departing from the scope of the present disclosure. Transceiver control box 120 may also comprise a switch or other suitable mechanism for inserting or removing each component set such that a single component set is operational at any particular time.

The calibration process performed by calibration system 100 involves providing a known signal through the components of base station 105 that are to be calibrated for processing by those components, for example by a base station radio frequency module (BS RFM) 150. Note that in the present disclosure the term "processed" and "processing" may include the modification that a signal may undergo when passing through passive and/or active electrical components or across electrical interfaces. This "processing" may include frequency selective attenuation and phase shift. This "processing" may include generation of spurious frequencies based on an input signal. The processed signal waveform is then compared with the known provided signal to obtain calibration data that characterizes the signal paths and their general effects on signals. The calibration data may be stored within the base station 105 and used by signal processing components (not shown in FIG. 1) within the base station 105 to compensate for non-ideal characteristics of the antenna array 115 and/or other radio frequency components in the signal path. In performing the calibration, two basic operations are involved: the transmit operation and the receive operation.

For the transmit operation, calibration processor 135 provides known signals to the BS RFM 150. These signals go through the BS RFM 150 and RF cables in base station 105 and reach combiner/splitter 110 and antenna array 115, where the signals are coupled into calibration system 100. The combined signal goes through calibration system 100 and arrives at calibration processor 135. Calibration processor 135 then analyzes the received signals to obtain the electrical characteristics of the transmit paths of base station 105, also referred to as the transmit calibration data, and the transmit calibration data may be stored in the base station 105. Depending on the results of the analysis, calibration processor 135 may issue certain control commands in order to calibrate base station 105.

For the receive operation, the signal path is reversed, with calibration processor 135 providing a known signal that goes through calibration system 100 and is coupled into combiner/splitter 110 and adaptive antenna array 115. The signal then travels through the RF cables and BS RFM 150 in base station 105 and reaches one or more baseband processors in a base station baseband module (BS BBM) 155 of the base station 105. The BS RFM 150 sends the results to calibration processor 135. Calibration processor 135 will then analyze the results to obtain the electrical characteristics of the receive paths of base station 105, also referred to as the receive calibration data, and the receive calibration data may be stored in the base station 105. Depending on the results of the analysis, calibration processor 135 may issue certain control commands in order to calibrate base station 105. Obtaining transmit and receive electrical characteristics, as described above, and storing the transmit and receive electrical characteristics may be referred to as calibrating the antenna array 115 or as calibration. The process of using the stored transmit and receive electrical characteristics to compensate for non-ideal characteristics of the BS RFM 150, the RF cables, and/or the antenna array 115 may also be referred to as calibration or calibrating the antenna array 115.

Each antenna of antenna array 115 in base station 105 has a corresponding transmit path and receive path for transmitting information from and receiving information at the base station 105. Therefore, it will be understood that transmit path 125 and receive path 130 of calibration system 100 are for calibrating the receive paths and transmit paths, respectively, corresponding to the antennas in antenna array 115 and not for transmitting information from or receiving information at the base station 105.

RP1 interfaces 140 comprise control and/or management communication paths between calibration system 100 and a base station clock and control module. In addition, RP1 interfaces 140 provide clock signals to calibration system 100. RP3 interfaces 145 provide calibration data traffic communication paths between calibration system 100 and the BS RFM 150.

Figure 2A:
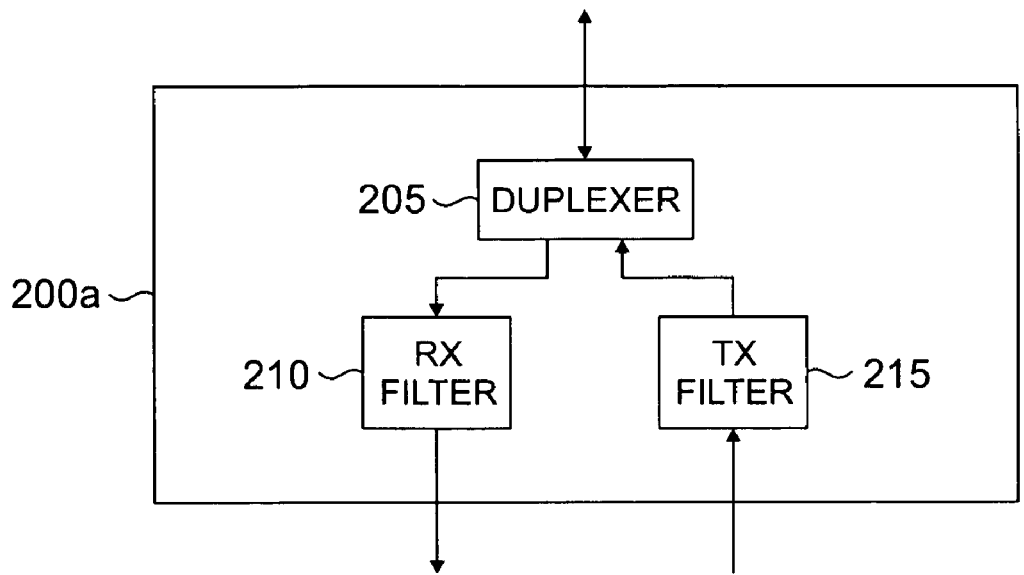
FIGS. 2A and 2B illustrate details of the transceiver control box of FIG. 1 according to one embodiment of the present disclosure.
Figure 2B:
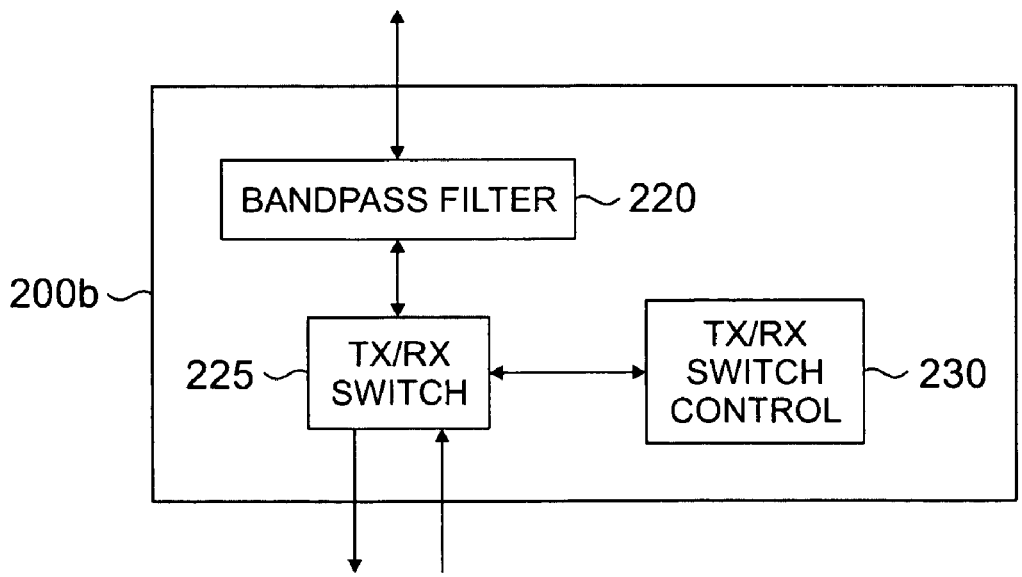

FIGS. 2A and 2B illustrate details of transceiver control box 120 according to the principles of the present disclosure. As described above in connection with FIG. 1, transceiver control box 120 comprises a plurality of operational mode component sets. For the embodiment illustrated in FIGS. 2A and 2B, transceiver control box 120 comprises a frequency division duplex (FDD) component set 200a and a time division duplex (TDD) component set 200b. It will be understood that, for this embodiment, transceiver control box 120 comprises both component sets 200a and 200b, each of which is operable to be placed in operation for the corresponding operational mode of base station 105.

FIG. 2A illustrates the FDD component set 200a, which comprises a duplexer 205, one or more receive filters 210, and one or more transmit filters 215. The number of receive filters 210 and the number of transmit filters 215 is determined by the multiplicity of the frequency bands in FDD operation mode. FIG. 2B illustrates the TDD component set 200b, which comprises a bandpass filter 220, a transmit/receive switch 225 that is operable to place TDD component set 200b in either a transmit state or a receive state, and a transmit/receive switch control 230 that is operable to control transmit/receive switch 225 in order to select in which state transmit/receive switch 225 will place TDD component set 200b.

Figure 3:
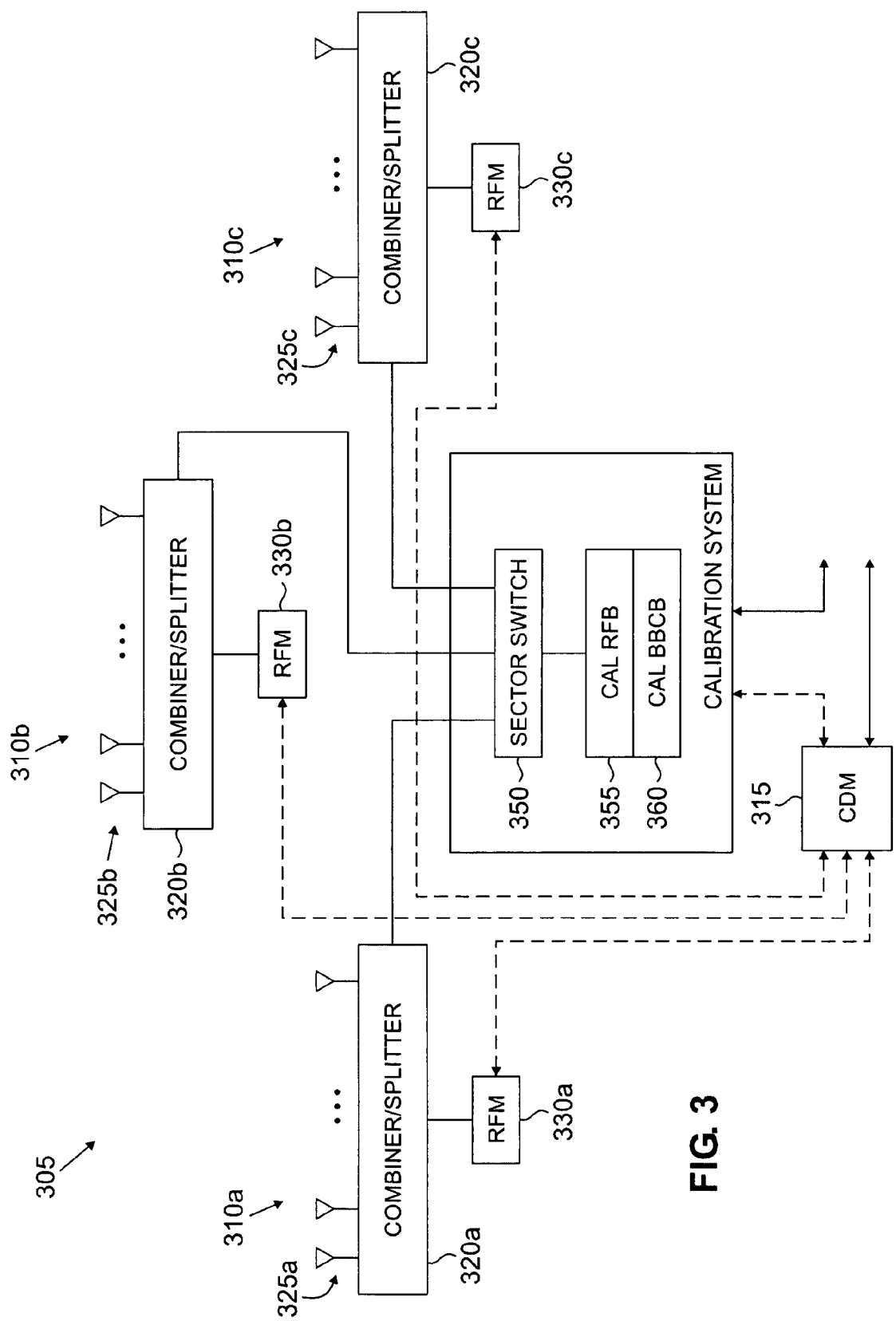
FIG. 3 illustrates a calibration system for a multi-sector, multi-FA base station according to one embodiment of the present disclosure.

FIG. 3 illustrates a calibration system 300 for a multi-sector, multi-frequency allocation (FA) base station 305 according to the principles of the present disclosure. For the illustrated embodiment, base station 305 comprises three sectors 310a-c and a combining and distribution module (CDM) 315, in addition to calibration system 100. However, it will be understood that base station 305 may comprise any suitable number of sectors 310 without departing from the scope of the present disclosure. In addition, it will be understood that base station 305 comprises additional components not illustrated in FIG. 3. Calibration system 300 and/or an operator of calibration system 300 may initiate a calibration of any sector 310 of base station 305 based on temperature, weather, base station location, elapsed time since a previous calibration and/or any other suitable calibration indicators.

Each sector 310 comprises a combiner/splitter 320, an adaptive antenna array 325, and a radio frequency module (RFM) 330. Calibration system 300 comprises a sector switch 350 that is operable to select one or more of the sectors 310 for calibration. Calibration system 300 also comprises a calibration radio frequency block (CAL RFB) 355 and a calibration baseband and control block (CAL BBCB) 360 that are coupled to each other and to sector switch 350. Calibration RFB 355 comprises a transceiver control box and receive and transmit paths, such as transceiver control box 120 and transmit path 125 and receive path 130 described above in connection with FIG. 1. Calibration BBCB 360 comprises a calibration processor, such as calibration processor 135 described above in connection with FIG. 1.

CDM 315 is operable to provide known signals from calibration BBCB 360 to each of RFMs 330a-c, as for example when calibrating the transmit paths, and processed signals from each of RFMs 330a-c, for example when calibrating the receive paths, to calibration BBCB 360 using RP3 links, as indicated by the dashed-line arrows. In addition, calibration system 300 and CDM 315 are each operable to provide control and/or management communication paths between calibration system 300 and a base station clock and control module (not shown in FIG. 3) using RP1 links, as indicated by the solid-line arrows.

In operation, sector switch 350 selects a particular one or more of the sectors 310 for calibration, and calibration RFB 355 and calibration BBCB 360 calibrate the selected sector(s) 310 in a manner similar to that described above for calibration system 100 of FIG. 1. In this way, calibration system 300 is able to provide calibration for multi-sector, multi-FA base stations 305 and for any suitable operational modes, such as FDD or TDD.

Figure 4A:
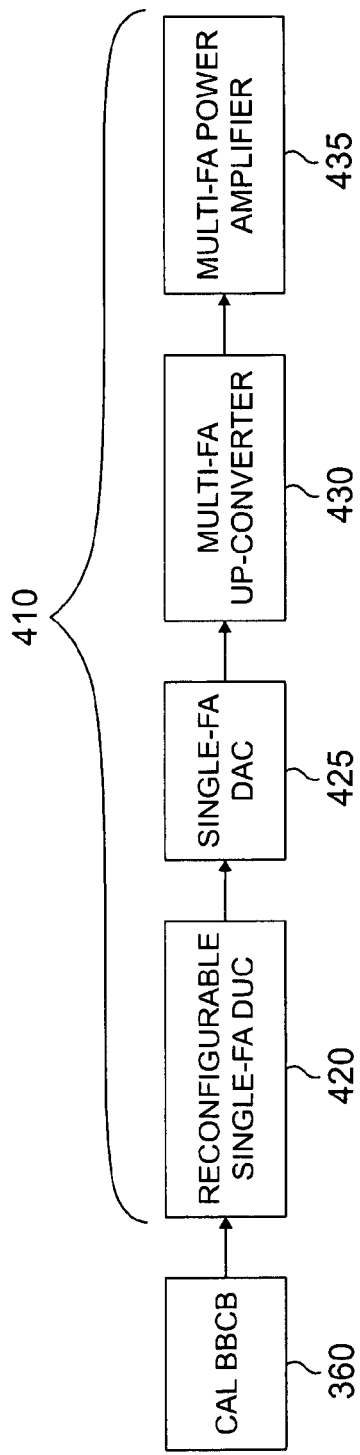
FIGS. 4A and 4B illustrate details of a portion of the calibration system of FIG. 3 according to a first embodiment of the present disclosure.
Figure 4B:
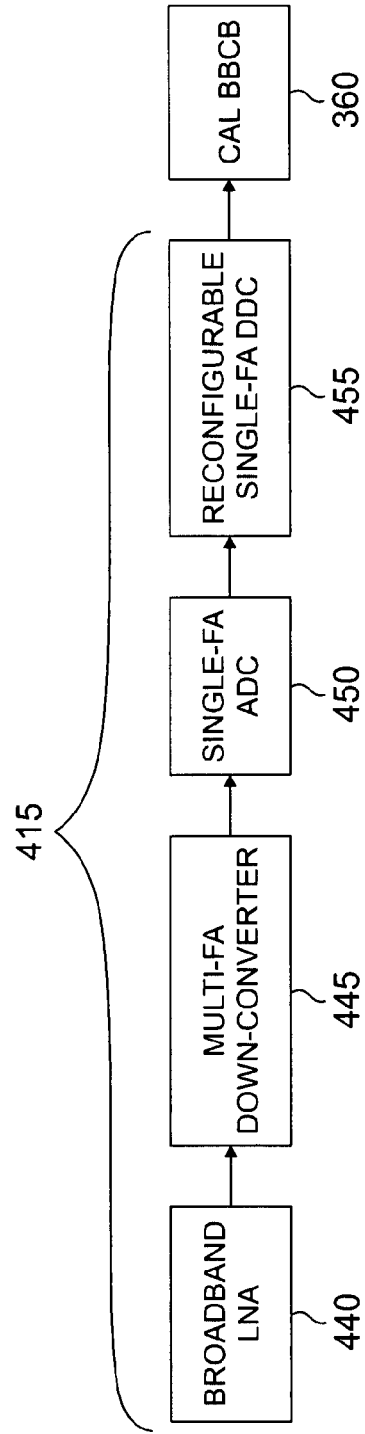

FIGS. 4A and 4B illustrate details of a portion of calibration system 300 according to a first embodiment of the present disclosure. For this embodiment, a base station 305 may be calibrated one frequency allocation at a time. The illustrated portion of calibration system 300 comprises calibration BBCB 360 and part of calibration RFB 355 in the form of a transmit path 410, shown in FIG. 4A, and a receive path 415, shown in FIG. 4B.

Transmit path 410 is operable to transmit a known signal from calibration BBCB 360 to combiner/splitter 320 of the sector 310 selected for calibration in order to calibrate the receive path of the selected sector 310. Transmit path 410 comprises a reconfigurable single-FA digital up-converter (DUC) 420, a single-FA digital-to-analog converter (DAC) 425, a multi-FA up-converter 430, and a multi-FA power amplifier 435. In an embodiment, the multi-FA power amplifier 435 may not be needed and therefore may not be included.

Receive path 415 is operable to receive a processed signal from combiner/splitter 320 of the sector 310 selected for calibration in order to calibrate the transmit path of the selected sector 310. Receive path 415 comprises a broadband low-noise amplifier (LNA) 440, a multi-FA down-converter 445, a single-FA analog-to-digital converter (ADC) 450, and a reconfigurable single-FA digital down-converter (DDC) 455. In an embodiment, the broadband LNA 440 may not be needed and therefore may not be included.

In operation, for transmit path 410, reconfigurable single-FA DUC 420 is initially configured for the frequency allocation to be calibrated. Calibration BBCB 360 then provides a known baseband signal to reconfigurable single-FA DUC 420. Reconfigurable single-FA DUC 420 up-converts the baseband signal into an intermediate frequency (IF) signal and provides the IF signal to single-FA DAC 425. Single-FA DAC 425 converts the IF signal into an analog signal and provides the analog signal to multi-FA up-converter 430. Multi-FA up-converter 430 up-converts the analog signal into a radio frequency (RF) signal and provides the RF signal to multi-FA power amplifier 435. Multi-FA power amplifier 435 provides the RF signal to the combiner/splitter 320 of the selected sector 310 for processing as any other signal received at adaptive antenna array 325 and combiner/splitter 320. After processing, calibration BBCB 360 analyzes the processed signal based on the known transmitted signal to determine receive calibration data, as described above in connection with FIG. 3.

Similarly, for receive path 415, reconfigurable single-FA DDC 455 is initially configured for the frequency allocation to be calibrated. Calibration BBCB 360 provides a known baseband signal to the selected sector 310 for transmission. Base station 305 generates an RF signal based on the baseband signal received from calibration BBCB 360. Broadband LNA 440 then receives the RF signal from combiner/splitter 320, amplifies the RF signal, and provides the amplified signal to multi-FA down-converter 445. Multi-FA down-converter 445 down-converts the amplified signal into an IF signal and provides the IF signal to single-FA ADC 450. Single-FA ADC 450 converts the IF signal into a digital signal and provides the digital signal to reconfigurable single-FA DDC 455. Reconfigurable single-FA DDC 455, which has been configured for the appropriate frequency allocation, down-converts the digital signal into a baseband signal and provides the baseband signal to calibration BBCB 360. The BBCB 360 analyzes the baseband signal based on the known baseband signal to determine transmit calibration data, as described above with connection with FIG. 3.

Figure 5:
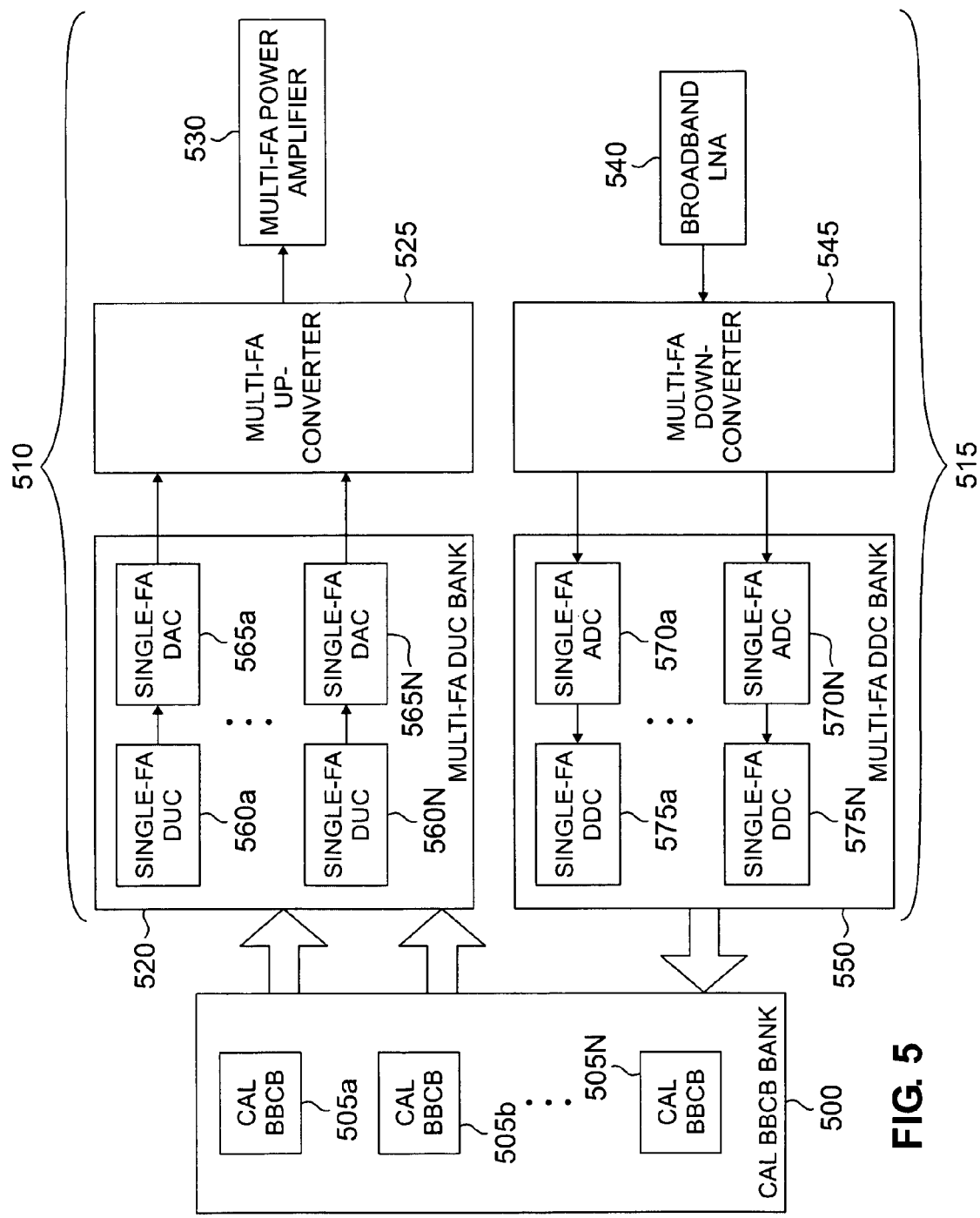
FIG. 5 illustrates details of a portion of the calibration system of FIG. 3 according to a second embodiment of the present disclosure.

FIG. 5 illustrates details of a portion of calibration system 300 according to a second embodiment of the present disclosure. For this embodiment, calibration system 300 is operable to support simultaneous multi-FA calibrations for a base station 305. If desired, any combination of the portions of calibration system 300 shown in FIGS. 4 and 5 may be implemented in order to provide any configuration between the illustrated embodiments that support calibrating one frequency allocation at a time (FIG. 4) and calibrating all frequency allocations simultaneously (FIG. 5).

The portion of calibration system 300 illustrated in FIG. 5 comprises a calibration BBCB bank 500, which comprises a plurality of calibration BBCBs 505 similar to calibration BBCB 360, and part of calibration RFB 355 in the form of a transmit path 510 and a receive path 515. Transmit path 510 comprises a multi-FA digital up-converter (DUC) bank 520, a multi-FA up-converter 525, and a multi-FA power amplifier 530. Receive path 515 comprises a broadband low-noise amplifier (LNA) 540, a multi-FA down-converter 545, and a multi-FA digital down-converter (DDC) bank 550.

Multi-FA DUC bank 520 comprises a plurality of single-FA DUCs 560 and a plurality of single-FA DACs 565, and multi-FA DDC bank 550 comprises a plurality of single-FA ADCs 570 and a plurality of single-FA DDCs 575. Calibration BBCB bank 500, multi-FA DUC bank 520, and multi-FA DDC bank 550 may each comprise any suitable number of components based on the number of frequency allocations (or channels) supported by base station 305, the capacity of calibration BBCBs 505, the number of channels each DUC 560 or DDC 575 supports, and the like. For this embodiment, each set of components in banks 520 and 550 has a different frequency assignment.

In operation, this embodiment functions similarly to the embodiment illustrated in FIG. 4, except each frequency allocation may be processed at the same time through the use of a dedicated set of components in banks 520 and 550. Thus, for transmit path 510, one or more calibration BBCBs 505, such as calibration BBCB 505a, for example, provides a known baseband signal to the corresponding single-FA DUC 560a in multi-FA DUC bank 520. Single-FA DUC 560a up-converts the baseband signal into an IF signal and provides the IF signal to single-FA DAC 565a. Single-FA DAC 565a converts the IF signal into an analog signal and provides the analog signal to multi-FA up-converter 525. Multi-FA up-converter 525 up-converts the analog signal into an RF signal and provides the RF signal to multi-FA power amplifier 530, where the RF signal is provided to base station 305 for processing as any other received signal. The calibration BBCB 505a analyzes the RF signal based on the known transmitted signal to determine receive calibration data, as described above in connection with FIG. 3.

Similarly, for receive path 515, one or more calibration BBCBs 505, such as calibration BBCB 505a, for example, provides a known baseband signal to base station 305 for transmission. Base station 305 generates an RF signal based on the baseband signal received from calibration BBCB 505a. Broadband LNA 540 then receives the RF signal from base station 305, amplifies the RF signal, and provides the amplified signal to multi-FA down-converter 545. Multi-FA down-converter 545 down-converts the amplified signal into an IF signal and provides the IF signal to single-FA ADC 570a in multi-FA DDC bank 550. Single-FA ADC 570a converts the IF signal into a digital signal and provides the digital signal to single-FA DDC 575a. Single-FA DDC 575a down-converts the digital signal into a baseband signal and provides the baseband signal to calibration BBCB 505a. The calibration BBCB 505a analyzes the baseband signal based on the known baseband signal to determine transmit calibration data, as described above in connection with FIG. 3. In this way, any one, any combination, or all of the frequency assignments supported by banks 500, 520 and 550 may be calibrated at any time, including simultaneously, for a particular sector 310.

Figure 6:
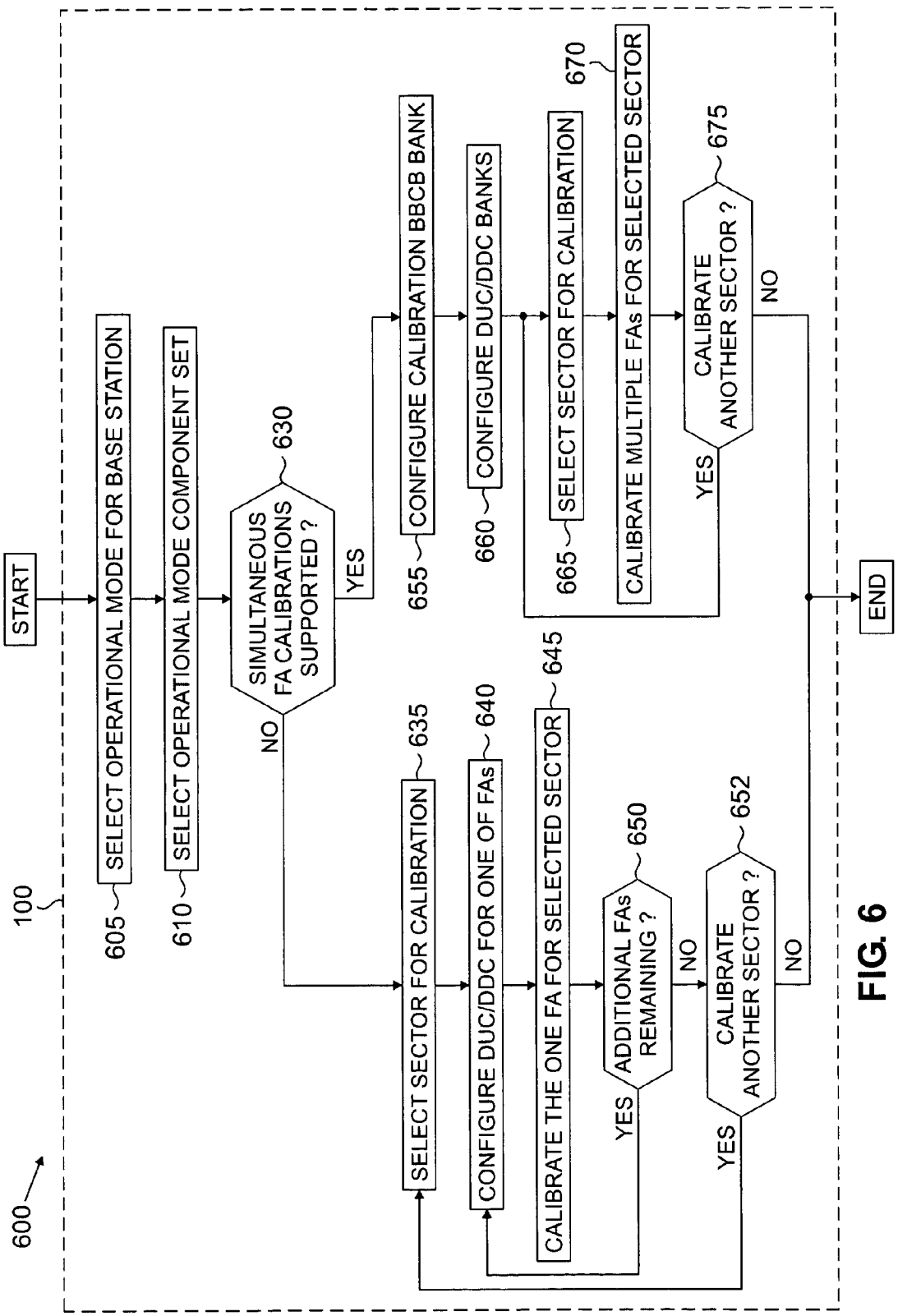
FIG. 6 is a flow diagram illustrating a method for calibrating multiple types of base stations using the calibration system of FIG. 1 or 3 according to one embodiment of the present disclosure.

FIG. 6 is a flow diagram illustrating a method 600 for calibrating multiple types of base stations, such as base station 105 or base station 305, using calibration system 100 or 300 according to the principles of the present disclosure. It will be understood that, before a calibration process is initiated, calibration system 100 or 300 may itself be calibrated, such as by a self-calibration or other suitable process.

Initially, an operational mode is selected for base station 105, 305 (process step 605). For example, the operational mode may be FDD, TDD, or any other suitable operational mode that is supported by transceiver control box 120, as described above in connection with FIG. 1.

After the operational mode has been selected for base station 105, 305, the corresponding operational mode component set, such as component set 200a or 200b, is selected in transceiver control box 120 (process step 610). For example, a switch may be moved or activated in transceiver control box 120 to select the component set or the selected component set may otherwise be made operational. In an embodiment, process step 605 and process step 610 may be combined in a single step.

Calibration system 300 calibrates base station 305 using the calibration system architecture illustrated in FIG. 4 when simultaneous calibrations of frequency allocations are not supported and using the calibration system architecture illustrated in FIG. 5 when simultaneous calibrations of frequency allocations are supported (process step 630).

Thus, when simultaneous calibrations are not supported (process step 630), a sector 310 is selected for calibration by sector switch 350 (process step 635). It will be understood that, for a single-sector base station 305, no sector switch 350 is needed to select the single sector 310. Reconfigurable single-FA digital up-converter (DUC) 420 and/or reconfigurable single-FA digital down-converter (DDC) 455 are configured for one of the frequency allocations corresponding to the selected sector 310 (process step 640). (Reconfigurable single-FA DUC 420 is configured for calibration of the receive path of base station 305, and reconfigurable single-FA DDC 455 is configured for calibration of the transmit path of base station 305.)

Calibration system 300 calibrates the one frequency allocation for the selected sector 310 of base station 305 using any suitable calibration method, such as the method described above in connection with FIG. 4 (process step 645). After calibrating the one frequency allocation for the selected sector 310, if additional frequency allocations for the selected sector 310 remain to be calibrated (process step 650), reconfigurable single-FA DUC 420 and/or reconfigurable single-FA DDC 455 are reconfigured for another one of the frequency allocations that has not yet been calibrated (process step 640).

After each of the frequency allocations for the selected sector 310 has been calibrated (process step 650), calibration system 300 may decide and/or be prompted by an operator to perform a calibration on another sector 310 at any suitable time (process step 652). If another sector 310 is to be calibrated (process step 652), the sector 310 is selected for calibration by sector switch 350 and the process repeats (process step 635).

When simultaneous calibrations are supported by calibration system 300 (process step 630), calibration BBCB bank 500 is configured for base station 305 (process step 655). In addition, the single-FA DUCs 560 in multi-FA DUC bank 520 and the single-FA DDCs 575 in multi-FA DDC bank 550 are configured for the frequency allocations of sectors 310 of base station 305 (process step 660).

After calibration system 300 is configured, a sector 310 may be selected for calibration by sector switch 350 (process step 665). It will be understood that, for a single-sector base station 305, no sector switch 350 is needed to select the single sector 310. Calibration system 300 may calibrate multiple frequency allocations for the selected sector 310 of base station 305 simultaneously using any suitable calibration method, such as the method described above in connection with FIG. 5 (process step 670). For one embodiment, calibration system 300 calibrates all frequency allocations for the selected sector 310 simultaneously. Calibration system 300 may decide and/or be prompted by an operator to perform a calibration on a different sector 310 at any suitable time (process step 675). If another sector 310 is to be calibrated (process step 675), the sector 310 is selected for calibration by sector switch 350 and the process repeats (process step 665).

The several embodiments of the base station calibration system 100, 300 described above provide considerable utility by promoting optimal operation of the antenna array 115, 325 of the base station 105, 305. Additionally, the ease of use of the disclosed base station calibration system 100, 300 permits timely recalibration of the antenna array 115, 325 to maintain optimal operation across the service life of the antenna array 115, 325. The disclosed calibration system architecture is flexible and may be applied to the base station products of many different vendors to enhance wireless network operations.

While several embodiments have been provided in the present disclosure, it should be understood that the disclosed systems and methods may be embodied in many other specific forms without departing from the spirit or scope of the present disclosure. The exemplary embodiments disclosed are to be considered as illustrative and not restrictive, and the intention is not to be limited to the details given herein. It is intended that the disclosure encompass all alternate forms within the scope of the appended claims along with their full scope of equivalents.

What is claimed is:

1. A method of calibrating a wireless base station, comprising:
   selecting a plurality of sectors for calibration by the wireless base station;
   selecting a plurality of operational modes for the wireless base station;
   selecting at least one operational mode component set corresponding to the selected plurality of operational modes from a plurality of operational mode component sets in the wireless base station;
   selecting at least one sector from the plurality of sectors for calibration, wherein a sector switch is used to select the at least one sector for calibration, and the sector switch is coupled to a calibration baseband and control block and a calibration radio frequency block; and
   simultaneously calibrating the plurality of operational modes in the wireless base station using the selected plurality of operational mode component sets, the wireless base station comprising an adaptive antenna array, wherein the calibration of the plurality of operational modes further comprises calibrating the at least one sector within the range of the wireless base station.

2. The method of claim 1, wherein the operational modes include a time division duplexing (TDD) mode and a frequency division duplexing (FDD) mode and wherein the operational mode component sets include a TDD operational mode component set and an FDD operational mode component set.

3. The method as set forth in claim 1, calibrating the wireless base station comprising providing a known signal to the wireless base station, receiving a processed signal from the wireless base station, the processed signal comprising the known signal processed by the wireless base station for transmission, and comparing the processed signal to the known signal.

4. The method as set forth in claim 3, receiving the processed signal from the wireless base station comprising receiving the processed signal through the selected operational mode component set.

5. The method as set forth in claim 1, calibrating the wireless base station comprising providing a known signal to a combiner/splitter of the wireless base station, receiving a processed signal from the wireless base station, the processed signal comprising the known signal processed by the wireless base station after receipt at the combiner/splitter, and comparing the processed signal to the known signal.

6. The method as set forth in claim 5, providing the known signal to the combiner/splitter comprising providing the known signal to the combiner/splitter through the selected operational mode component set.

7. The method as set forth in claim 1, the operational modes comprising at least a frequency division duplexing (FDD) operational mode and a time division duplexing (TDD) operational mode.

8. The method as set forth in claim 7, the operational mode component set corresponding to the FDD operational mode comprising a duplexer, a receive filter and a transmit filter, and the operational mode component set corresponding to the TDD operational mode comprising a bandpass filter, a transmit/receive switch, and a transmit/receive switch control.

9. A method of calibrating a wireless base station, comprising:
selecting a first sector for calibration, the wireless base station comprising an adaptive antenna array and a plurality of multi-frequency allocation sectors, the first sector selected from the plurality of sectors;
calibrating the first sector using a calibration system comprising a plurality of operational mode component sets, wherein the calibration system comprises a sector switch, a calibration baseband and control block, and a calibration radio frequency block; and
selecting a second sector from the plurality of sectors for calibration using the sector switch; and
calibrating the second sector using the calibration system, wherein the first sector and second sector are simultaneously calibrated.

10. The method as set forth in claim 9, further comprising:
selecting one operational mode from a plurality of operational modes for the wireless base station;
selecting one of the operational mode component sets based on the selected operational mode; and
calibrating the first sector and the second sector using the selected operational mode component set.

11. The method of claim 10, wherein the operational modes include a time division duplexing (TDD) mode and a frequency division duplexing (FDD) mode and wherein the operational mode component sets include a TDD operational mode component set and an FDD operational mode component set.

12. The method as set forth in claim 9, further comprising:
configuring at least one of a digital up-converter and a digital down-converter based on the first sector before calibrating the first sector; and
configuring at least one of the digital up-converter and the digital down-converter based on the second sector before calibrating the second sector.

13. The method as set forth in claim 9, further comprising:
configuring a plurality of control blocks based on the wireless base station; and
configuring a plurality of digital up-converters and a plurality of digital down-converters based on the wireless base station, wherein the number of control blocks, digital up-converters, and digital down-converters is based on a number of frequency allocations included in the multi-frequency allocation sectors.

14. The method as set forth in claim 13, configuring the digital up converters and the digital down-converters comprising configuring a digital up-converter for each of the frequency allocations and configuring a digital down-converter for each of the frequency allocations.

15. A system for calibrating a wireless base station, comprising:
a sector switch operable to select a plurality of sectors for simultaneous calibration in the wireless base station, the wireless base station comprising an adaptive antenna array and a plurality of multi-frequency allocation sectors;
a radio frequency block (RFB) coupled to the sector switch, the RFB comprising a transceiver control box that comprises a plurality of operational mode component sets, and the RFB operable to convert signals from baseband to radio frequency and from radio frequency to baseband; and
a baseband and control block (BBCB) coupled to the RFB, the baseband and control block BBCB operable to provide baseband signals and to process baseband signals for calibrating the wireless base station, wherein the system simultaneously calibrates the plurality of sectors using a plurality of operational modes.

16. The system as set forth in claim 15, the transceiver control box comprising at least a frequency division duplexing (FDD) operational mode component set and a time division duplexing (TDD) operational mode component set.

17. The system as set forth in claim 16, the FDD operational mode component set comprising a duplexer, a receive filter and a transmit filter, and the TDD operational mode component set comprising a bandpass filter, a transmit/receive switch, and a transmit/receive switch control.

18. The system as set forth in claim 15, the RFB further comprising a transmit path and a receive path, the transmit path comprising a reconfigurable single-frequency allocation (FA) digital up-converter (DUG) operable to be reconfigured for each of the frequency allocations, and the receive path comprising a reconfigurable single-FA digital down-converter (DDC) operable to be reconfigured for each of the frequency allocations.

19. The system as set forth in claim 18, the transmit path further comprising a single-FA digital-to-analog converter (DAC), a multi-FA up-converter, and a multi-FA power amplifier, and the receive path further comprising a broadband low-noise amplifier, a multi-FA down-converter, and a single-FA analog-to-digital converter (ADC).

20. The system as set forth in claim 15, the RFB further comprising a transmit path and a receive path, the transmit path comprising a multi-FA DUG bank that comprises, for each frequency allocation, a single-FA DUG operable to be configured for the frequency allocation, and the receive path comprising a multi-FA DDC bank that comprises, for each frequency allocation, a single-FA DDC operable to be configured for the frequency allocation.

21. The system as set forth in claim 20, the multi-FA DUC bank further comprising, for each frequency allocation, a single-FA DAC coupled to the single-FA DUG, and the multi-FA DDC bank further comprising, for each frequency allocation, a single-FA ADC coupled to the single-FA DDC.

22. The system as set forth in claim 21, the transmit path further comprising a multi-FA up-converter and a multi-FA power amplifier, and the receive path further comprising a broadband low-noise amplifier and a multi-FA down-converter.

* * * * *

UNITED STATES PATENT AND TRADEMARK OFFICE
CERTIFICATE OF CORRECTION

PATENT NO. : 7,672,668 B2
APPLICATION NO. : 11/221088
DATED : March 2, 2010
INVENTOR(S) : Yinong Ding et al.

It is certified that error appears in the above-identified patent and that said Letters Patent is hereby corrected as shown below:

Column 12, claim 18, line 32, delete "DUG" and replace with --DUC--;

Column 12, claim 20, line 45, delete "DUG" and replace with --DUC--;

Column 12, claim 20, line 46, delete "DUG" and replace with --DUC--;

Column 12, claim 21, line 53, delete "DUG" and replace with --DUC--.

Signed and Sealed this
Thirty-first Day of May, 2011

David J. Kappos
*Director of the United States Patent and Trademark Office*